(12) United States Patent
Choi et al.

(10) Patent No.: US 6,539,840 B2
(45) Date of Patent: Apr. 1, 2003

(54) MICROWAVE OVEN HAVING A TOASTER

(75) Inventors: Seong-Soo Choi, Changwon Gyeongnam (KR); Sang-Jin Oh, Changwon Gyeongnam (KR); Yoon-Gun Baek, Changwon Gyeongnam (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 10/005,322

(22) Filed: Dec. 7, 2001

(65) Prior Publication Data

US 2002/0070212 A1 Jun. 13, 2002

(30) Foreign Application Priority Data

Dec. 8, 2000 (KR) ............................. 00-74570
Aug. 10, 2001 (KR) ............................. 01-48382

(51) Int. Cl.[7] .......................... A47J 37/00; A47J 37/03; H05B 6/68
(52) U.S. Cl. ............................. 99/331; 99/357; 99/385; 99/389; 99/391; 219/679; 219/702; 219/720
(58) Field of Search ........................ 99/357, 331–333, 99/385–389, 391, 329 RT, 329 P, 329 R; 219/388, 681, 391, 680, 395, 679, 719, 720, 506, 702, 756; 345/87, 104, 50; 349/1, 16; D7/351

(56) References Cited

U.S. PATENT DOCUMENTS

| D303,607 S | * | 9/1989 | Saito ........................... D7/351 |
| D305,969 S | * | 2/1990 | Saito ........................... D7/351 |
| 5,834,745 A | * | 11/1998 | Aoki et al. ................. 219/720 |
| 6,013,908 A | * | 1/2000 | Kume et al. ................ 219/719 |
| 6,080,963 A | * | 6/2000 | Cardillo et al. ......... 99/329 RT |

FOREIGN PATENT DOCUMENTS

| JP | 01163701 A1 | 6/1989 |
| JP | 02004112 A1 | 1/1990 |
| JP | 02004113 A1 | 1/1990 |

* cited by examiner

Primary Examiner—Timothy F. Simone
(74) Attorney, Agent, or Firm—McKenna Long & Aldridge LLP

(57) ABSTRACT

Disclosed is a microwave oven having a toaster, in which slices of bread can be baked. The microwave oven has a heating chamber for heating food therein; an instrument compartment containing electric components for generating microwave oven supplied to the heating chamber; a toaster casing disposed in front of the instrument compartment with its front open; a toaster door for opening and closing the open front of the toaster casing; and at least a heater disposed in the toaster casing so as to heat bread. In the microwave oven, the toaster section is arranged in front of the instrument compartment, so that the space in the microwave oven is most effectively utilized.

11 Claims, 8 Drawing Sheets

MICROWAVE OVEN HAVING A TOASTER

BACKGROUND OF THE INVENTION

1. Field of the Invention

The present invention relates to a microwave oven, and more particularly to a microwave oven having a toaster, in which slices of bread can be baked by means of a heater, so as to enlarge the entire utility of the microwave oven.

2. Description of the Prior Art

In general, a microwave oven is an apparatus for heating an object by means of microwave. Referring to FIG. 1, which shows a construction of a general microwave oven, a heating chamber 2, in which microwave is supplied and an object to be heated by means of the microwave is put, is arranged in a cavity assembly 1, and the heating chamber 2 is opened and closed by a door 4, in the general microwave oven.

Further, at one side of the heating chamber 2 of the cavity assembly 1, which is the right side of the drawing, is arranged an instrument compartment 10, which contains various electric equipments for generating microwave and is covered by an outer casing 6. In the instrument compartment 10, installed are various components including a magnetron 12 for generating microwave, a high-voltage transformer 14 for applying high voltage to the magnetron 12, a blower fan 16 for cooling the electric components and forming an air-flow passing through the heating chamber 2, and the like.

Since the general microwave oven as described above utilizes the microwave in heating an object, it is improper for the microwave oven to perform as a toaster for baking bread, in consideration of the heating characteristic of the microwave. It is naturally preferred that the microwave oven, which is an apparatus for heating food, has a function capable of heating various kinds of food in various forms, so as to increase the usability of the microwave oven. It is more preferred that the microwave oven has, for example, a toaster function capable of baking bread.

In order to meet the above requirement, disclosed has been a microwave oven having a toaster function by a Japanese Patent Laid-Open Publication No. 1991-271630. In the disclosed Japanese microwave oven, a toaster capable of baking bread put therein is arranged at one upper side of an outer casing of the microwave oven.

However, in order to insert slices of bread, which are to be baked in the microwave oven, into the microwave oven through an upper surface of the microwave oven as does in the above Japanese microwave oven, a separate space capable of containing slices of bread has to be arranged between the cavity assembly 1 and the outer casing 6. In result, the microwave oven is disadvantageous in that it necessarily has a relatively large dimension. Further, it goes without saying that the construction of the conventional microwave oven does not conform to the current trend requiring electronic appliances, each of which is compact and has various functions.

In consideration of the conventional technology as described above, it is preferred that a microwave oven has an additional toaster function capable of baking slices of bread while it conforms to the current trend of minification in the dimensions of electronic appliances.

SUMMARY OF THE INVENTION

Accordingly, the present invention has been made to solve the above-mentioned problems occurring in the prior art, and an object of the present invention is to provide a microwave oven having a function of a toaster, which enables a user to bake bread even by means of the microwave oven.

It is another object of the present invention is to provide a microwave oven, which has an additional toaster function by means of heaters while sufficiently securing a heating chamber utilizing microwave, without increasing the entire dimension of the microwave oven, thereby having a compact appearance together with various functions.

In order to accomplish this object, there is provided a microwave oven having a toaster, the microwave oven comprising: a heating chamber, in which food is heated; an instrument compartment disposed at one side of the heating chamber, the instrument compartment containing electric components for generating microwave oven supplied to the heating chamber; a toaster casing disposed in front of the instrument compartment, the toaster having input ports formed at a front surface of the toaster; and a toaster section disposed in the toaster casing, the toaster section having at least a heater for heating bread.

According to the present invention as described above, since the toaster section is disposed in front of the instrument compartment, a separate space is not required, so that the microwave oven can have a toaster function without increasing the entire volume thereof. Further, anticipated is an additional advantage in the construction thereof, in that the electric power required by the toaster section can be easily supplied from the instrument compartment.

Further, the toaster door is disposed in such a manner that the toaster door can be opened and closed while pivoting downward and upward about a hinge shaft disposed at a lower end of the toaster door.

Also, the microwave oven may further comprise: a tray for seating bread thereon, the tray being disposed at an inner bottom portion of the toaster casing; and at least a cooperating lever for connecting the tray with a middle portion of a side of the toaster door, so that the tray is drawn forward by an opening operation of the toaster door.

It is preferred that the cooperating lever has a rear end connected to a spring, which is fixed to a rear wall of the toaster casing, so that the cooperating lever is elastically supported backward.

More preferably, the tray comprises sliding protuberances protruding laterally outward from both sides of the tray, the sliding protuberances being inserted in guide slots formed at side surfaces of the toaster casing, so as to guide forward and backward movements of the tray.

Also, the microwave oven may further comprise a flour collector disposed at a lowest portion of the casing, the flour collector having a shape of a drawer, which is horizontally inserted into and drawn out of the toaster casing.

The heater disposed in the toaster casing may comprise a core plate, on which heat wires are wound, and outer plates, which are disposed as to surround both side surfaces of the core plate. Also, the heater further comprises a plurality of guides disposed at outer portions of the heater, which are arranged in such a manner as to maintain the heater in a location spaced with a predetermined distance from the bread.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
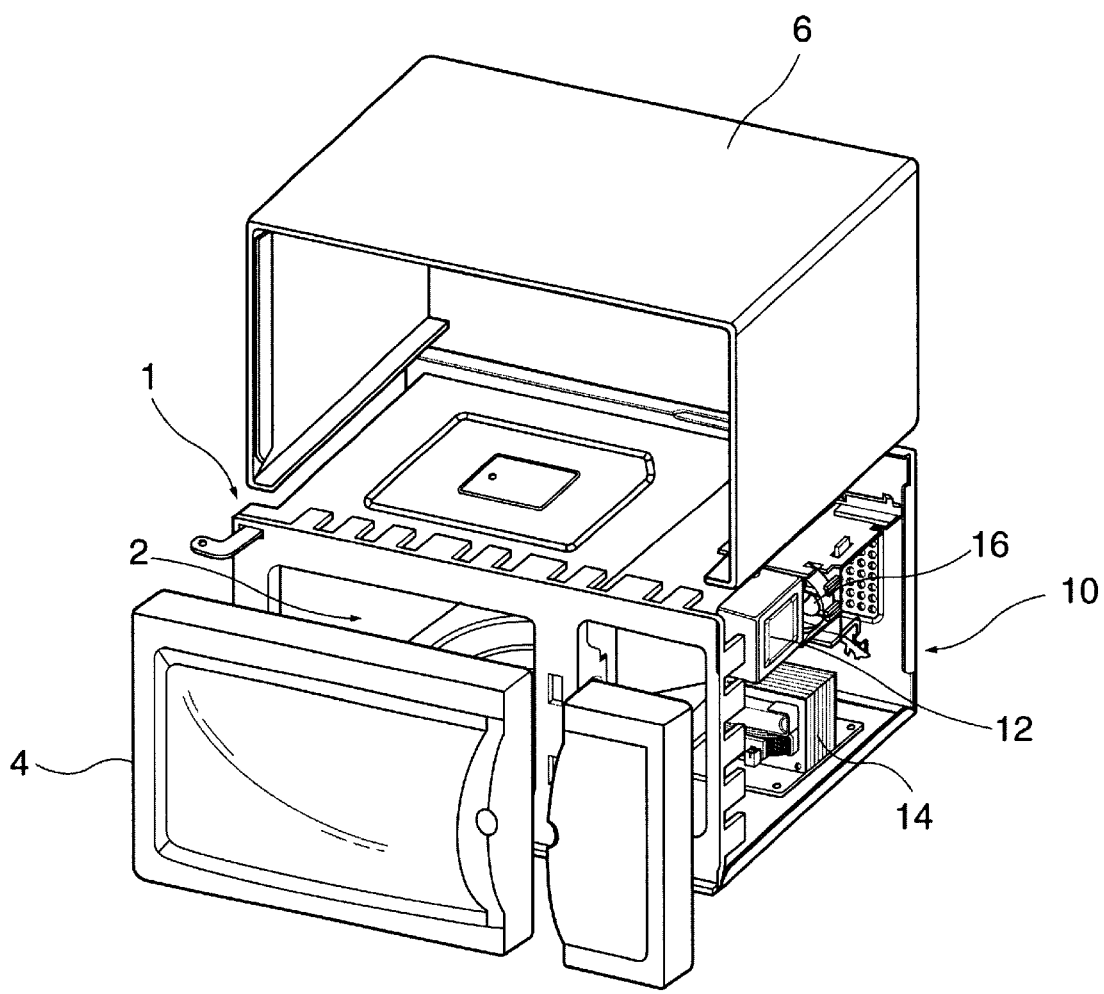
FIG. 1 is an exploded perspective view of a general microwave oven, for showing an internal construction thereof.
Figure 2:
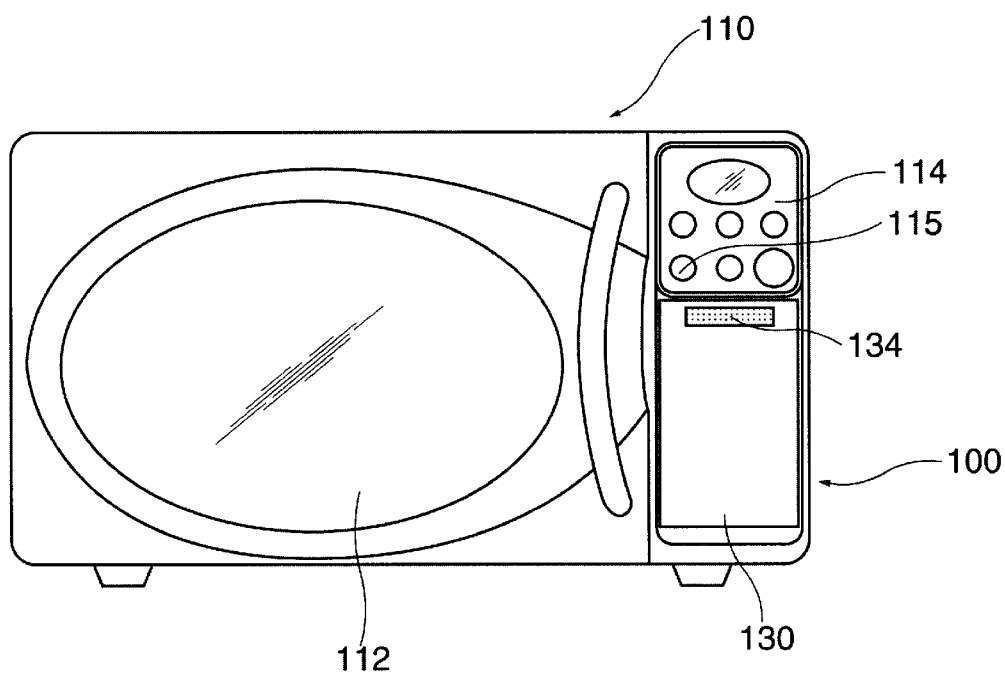
FIG. 2 is a front view of a microwave oven according to the present invention, in which a toaster door is closed.
Figure 3:
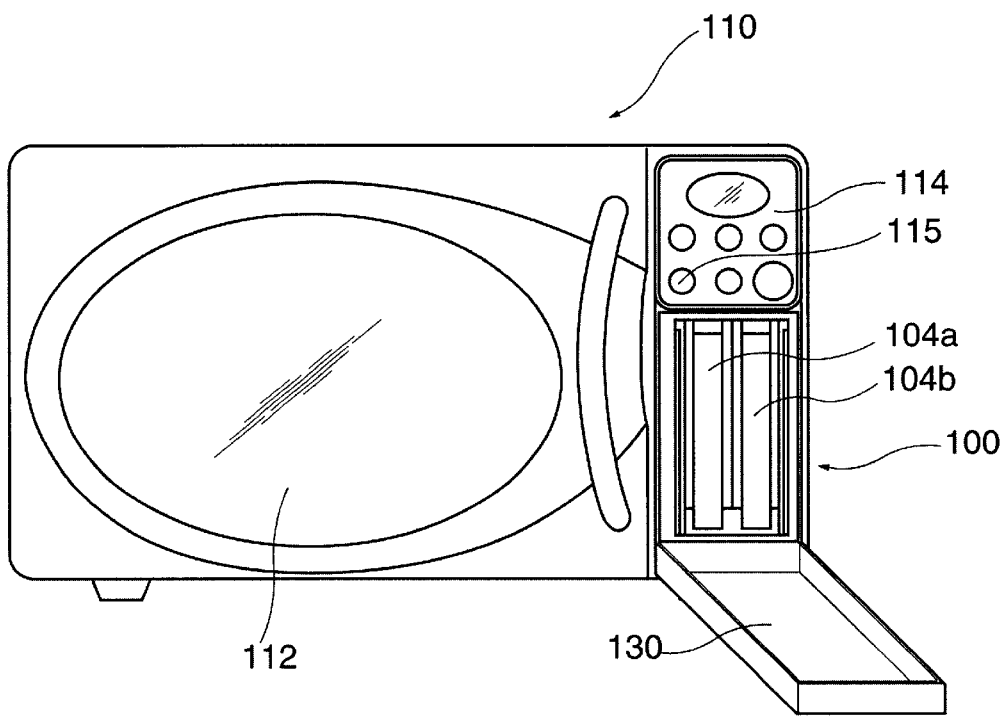
FIG. 3 is a front view of the microwave oven according to the present invention, in which the toaster door is opened.
Figure 4:
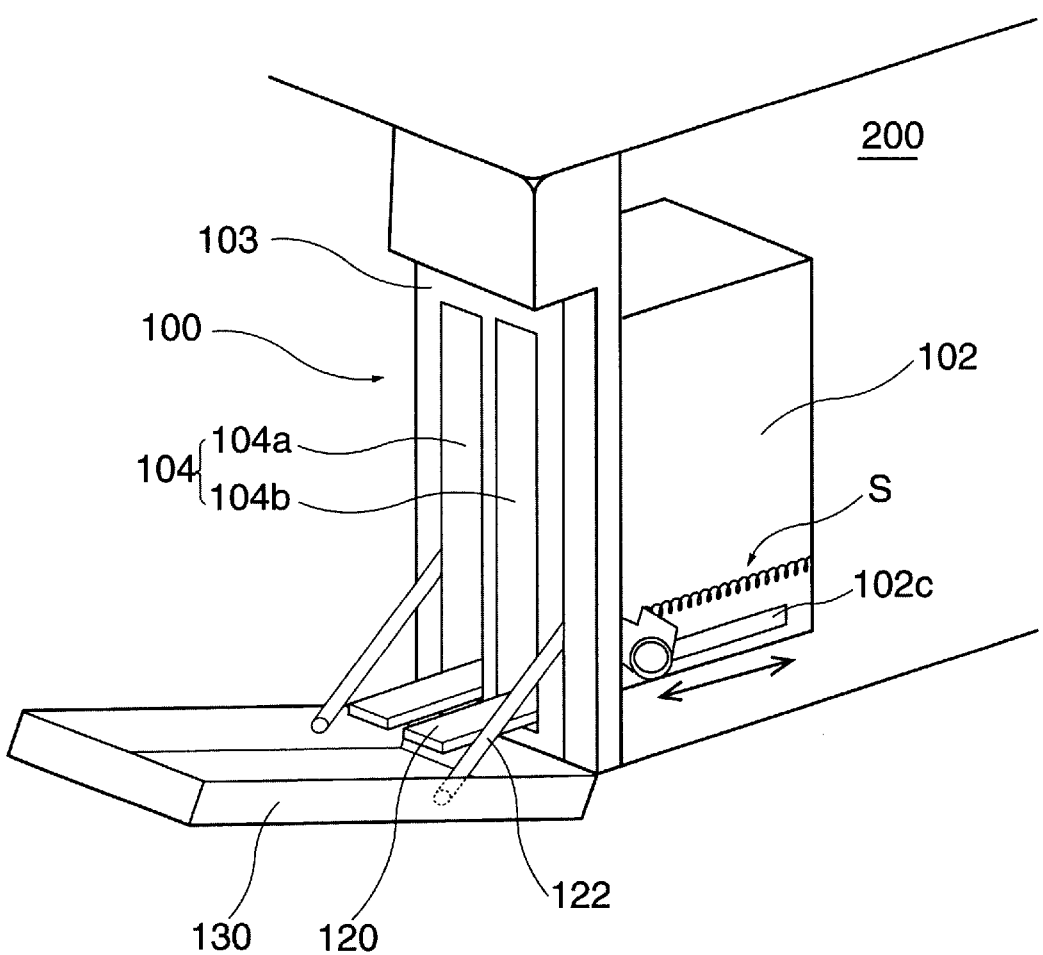
FIG. 4 is an enlarged perspective view of a toaster section employed in the microwave oven according to the present invention.

Referring to FIGS. 2 to 4, a toaster section 100, in which bread can be baked, is disposed in front of an instrument compartment 200 in a microwave oven 110 according to the present invention.

Figure 5:
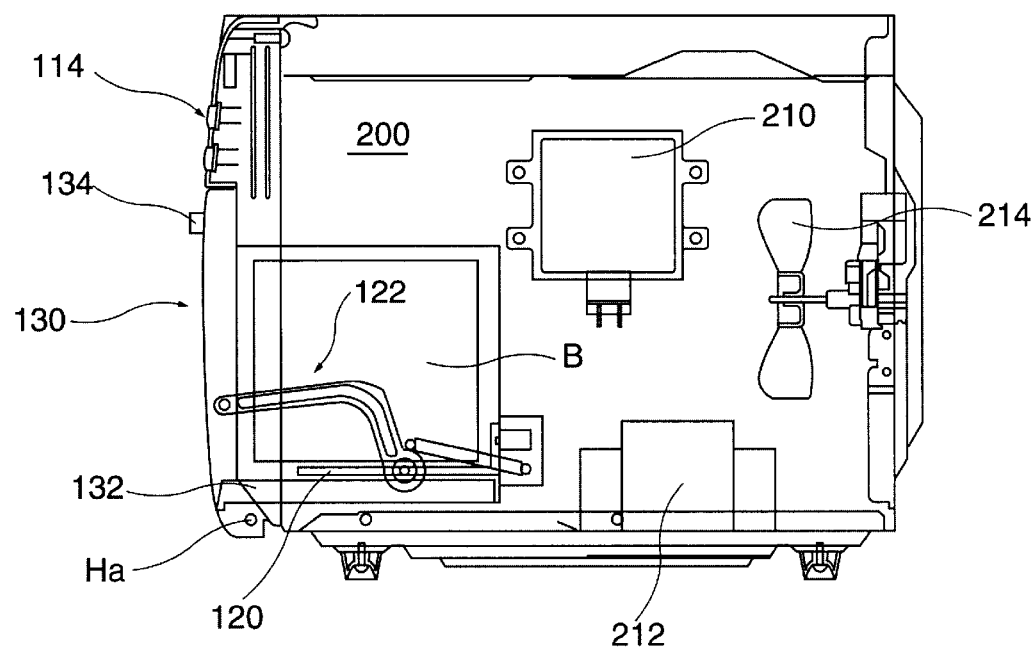
FIG. 5 is a side sectional view of the microwave oven according to the present invention, in which the toaster door is closed.
Figure 6:
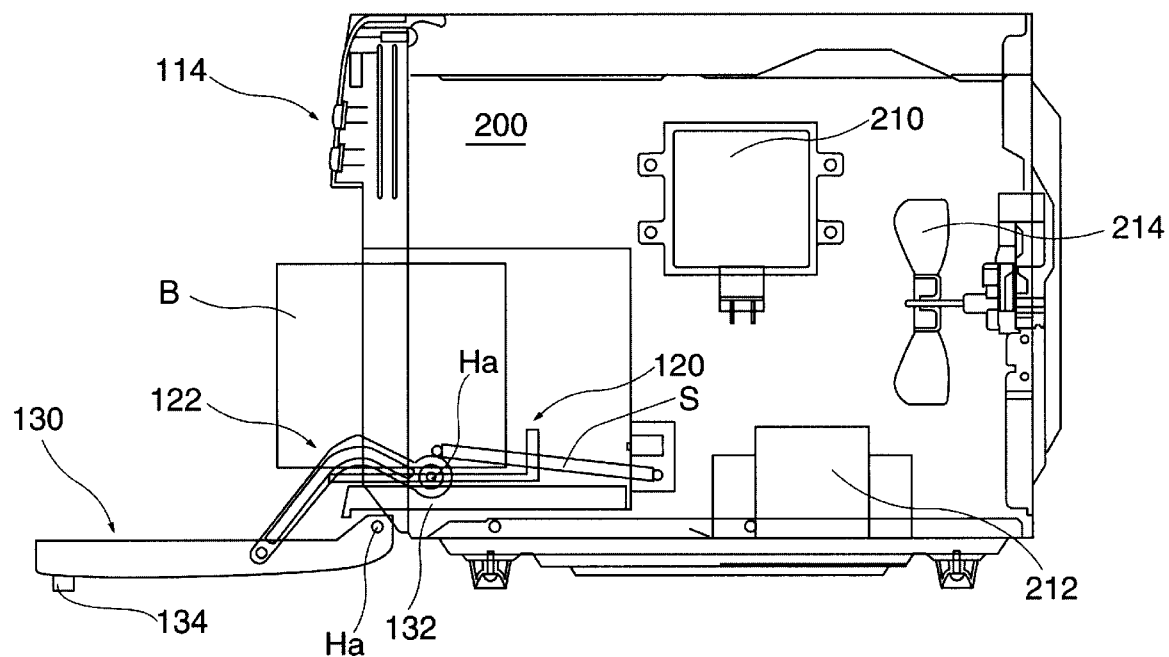
FIG. 6 is a side sectional view of the microwave oven according to the present invention, in which the toaster door is opened.

The present invention prevents the dimension of the entire microwave oven from being increased and the volume of a heating chamber from being reduced, since the toaster section 100 is installed in front of the instrument compartment 200 of the microwave oven 110 as shown in FIGS. 5 and 6.

Further, by locating the toaster section 100 in front of the instrument compartment 200, there is provided an advantage in an aspect of electric wiring. As will be described later, since a heater for heating bread can be installed in front of the instrument compartment 200, electric power supplied to the instrument compartment 200 can be more simply connected to the heater.

Hereinafter, a more detailed description about the construction of the toaster section 100 will be given with reference to FIGS. 4 to 6. As shown, the toaster section 100 according to the present invention is disposed in front of the instrument compartment 200, which contains various electric components for generating microwave as shown in FIG. 5, such as a magnetron 210 for generating microwave, a high-voltage transformer 212 and a high-voltage capacitor (not shown) for applying high-voltage to the magnetron, and a blower fan 214 for cooling the electric components. The instrument compartment 200 is an internal section of the microwave oven, which has a relatively much space to be utilized. Therefore, by locating the toaster section 100 in front of the instrument compartment 200, a spare space in the instrument compartment 200 can be sufficiently utilized, so that the microwave oven can be provided with the function of the toaster without increasing the volume of the microwave oven.

Further, according to the present invention, the toaster section 100 has openings formed at a front surface of the microwave oven. Further, it is preferred that the toaster section 100 can be opened and closed by a toaster door 130. As shown, the toaster section 100 is located under a control panel 114 having a plurality of operation buttons formed thereon, which is disposed at the front surface of the microwave oven 110.

As shown in FIG. 4, the toaster section 100 includes a casing 102 having a predetermined space formed inside of the instrument compartment 200, and the toaster door 130 disposed in front of the casing 102 to open and close the casing 102. Inside of the casing 102 is disposed a heater for heating bread, which will be described later. Further, a pair of input ports 104a and 104b, through which two slices of bread can be inserted, are formed at the front surface of the casing 102. In the present embodiment as shown, the input ports 104 are formed at a front plate 103 and respectively have a dimension, which enables a slice of bread to be inserted with standing upright in an lengthwise direction.

Moreover, the toaster door 130 opens and closes the input ports 104, thereby preventing heat from leaking when slices of bread are being heated therein while preventing alien material from coming into the toaster section 100 from the exterior when the toaster section 100 is not used.

The toaster door 130 in the present embodiment as shown, is a pull-down type door, which is opened downward from above about the lower end thereof. As shown in FIGS. 5 and 6, the toaster door 130 is opened downward from above about a hinge shaft Ha, which extends through both ends of the lower end of the toaster door 130. Further, accompanied with the opening and closing operation of the toaster door 130, the tray 120 is drawn out of and inserted into the casing 102, so that the bread is drawn out of and inserted into the casing 102.

Hereinafter, described will be the constructions of the toaster door 130 and the tray 120, with reference to FIGS. 5 to 7. As shown, a pair of cooperating levers 122 are connected to middle portions of both sides of the toaster door 130, which pivots downward and upward about the hinge shaft Ha when it is opened and closed. Rear ends of the cooperating levers 122 are connected to both sides of the tray 120. In the present embodiment as shown, it is noticed that the cooperating levers 122 are bent with a predetermined angle. The cooperating levers 122 are pivotally connected to each of the toaster door 130 and the tray 120.

Therefore, when the toaster door 130 is opened, that is, when the state of the microwave oven is changed from that shown in FIG. 5 to that shown in FIG. 6, the cooperating levers 122 connected to the toaster door 130 are drawn forward beyond the hinge shaft Ha. Therefore, bread B put on the tray 120 is also drawn forward, so that the microwave oven comes into the state shown in FIG. 6.

In addition, to the rear end of each of the cooperating levers 122 is connected a spring S whose rear end is fixed to the rear surface of the casing 102. In result, when the toaster door 130 is opened, the springs S are elongated to have an elastic restoring force according to the forward movement of the cooperating levers 122. In contrast, when the toaster door 130 is closed, the cooperating levers 122 are pulled backward by the elastic restoring force of the springs S, so as to make the tray 120 slide backward also to its original position.

Figure 7:
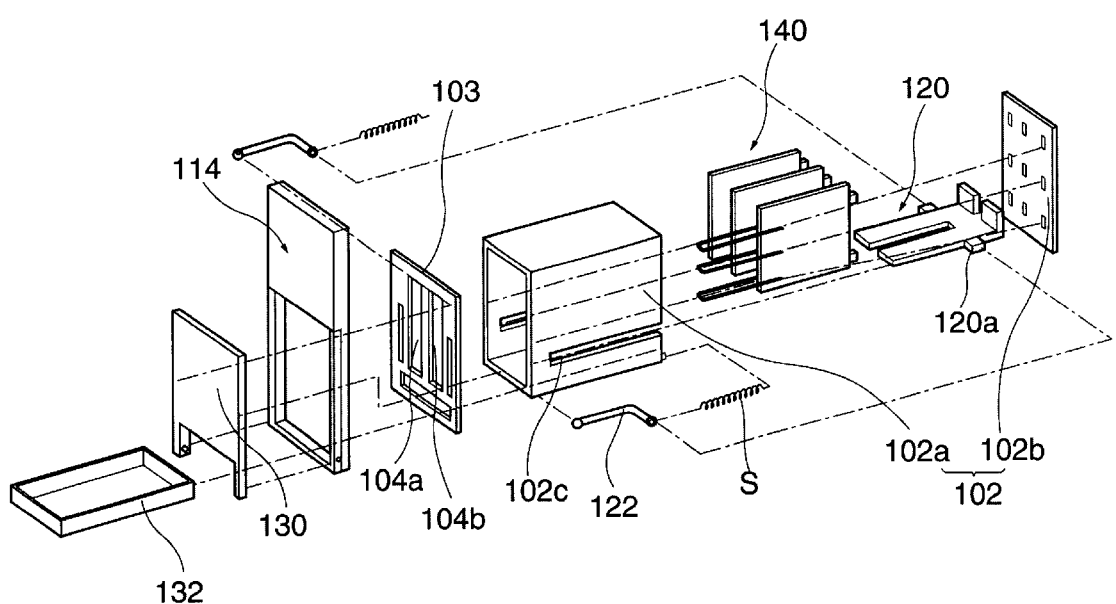
FIG. 7 is an exploded perspective view of the toaster section employed in the microwave oven according to the present invention.

As shown in FIG. 7, the casing 102 of the toaster section 100 includes a casing tube 102a having a shape of a rectangular pipe, and a back plate 102b forming a rear end wall of the rectangular pipe. At both side walls of the casing 102 are formed guide slots 102c respectively extending in the horizontal direction. Further, in the guide slots 102c are inserted sliding protuberances 120a protruding laterally outward from both sides of a bottom portion of the tray 120. Consequently, when the tray 120 moves forward and backward according to the opening and the closing of the toaster door 130, the sliding protuberances 120a slide in the horizontal direction while being guided along the guide slots 102c. Therefore, the tray 120 can be moved forward and backward in a more stable state.

As shown in FIGS. 5 to 7, a flour collector 132 is disposed under the casing 102, in which slices of bread B are put in and baked. The flour collector 132 is arranged in order to collect flour, which is produced while the slices of bread B are baked in, put in, and drawn out of the casing 102. The flour collector 132 has a shape of a drawer, which is horizontally inserted into and drawn out of the lowest portion of the casing 102.

Figure 8:
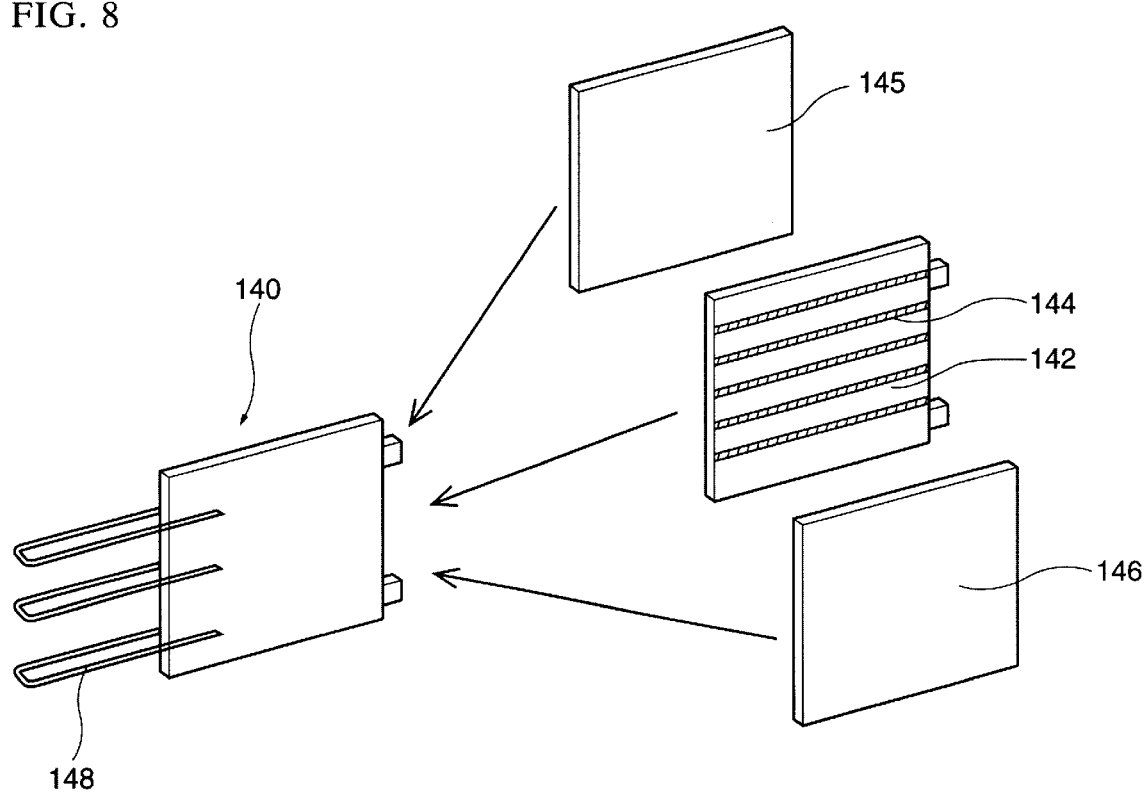
FIG. 8 is a perspective view of a heater employed in the microwave oven according to the present invention, together with its exploded perspective view.

Hereinafter, with reference to FIG. 8, described will be a heater 140 installed in the casing 102 of the toaster section 100. The heater 140 is a component for generating heat to bake the slices of bread B. The heater 140 includes a core plate 142, on which wound are heat wires 144 generating heat when electricity is applied to the heat wires 144, and outer plates 145 and 146 so disposed as to surround both side surfaces of the core plate 142. The outer plates 145 and 146 attached to both sides of the core plate 142 are made from a material having a resistance to heat, such as asbestos. The outer plates 145 and 146 are arranged in order to prevent the slices of bread from being in direct contact with the core plate 142 and enable the heat generated from the heat wires 144 to be uniformly transferred to the entire surface of the bread.

Moreover, a plurality of guides 148 are disposed at outer portions of the heater 140 having the outer plates 145 and 146 and the core plate 142. The guides 148 are so arranged as to fix the surface of the outer plates and to maintain the heater 140 in a location spaced with a predetermined distance from the heated bread. As shown in FIG. 7, three heaters 140, each of which has the construction as described above, are disposed in the casing 102. It goes without saying that such an arrangement of the three heaters 140 as shown are arranged with an intention to heat both side surfaces of each of two slices of bread, which are inserted respectively through the pair of the input ports 104. Consequently, according to the above arrangement of the three heaters 140, inside of the input ports 104 are defined a pair of heating chambers, in each of which a slice of bread is inserted and heated.

Hereinafter, described will be the operation of the microwave oven having the above-described construction according to the present invention.

In a state where the toaster door 130 is closed as shown in FIG. 2, when a user wants to bake slices of bread, the user has to open the toaster door 130 at first. When a grip 134 formed on an outer surface of the toaster door 130 is pulled, the toaster door 130 is pivoted downward about the hinge shaft Ha into an open state as shown in FIGS. 3 and 4.

As the toaster door 130 is opened, the tray 120 disposed in the casing 102 is correspondingly drawn forward out of the casing 102, owing to the construction that the rear ends of the cooperating levers 122 are connected with the sliding protuberances 120a of the tray 120 as described above. Further, the tray 120 is drawn forward out of the casing 102 in the horizontal direction while the sliding protuberances 120a of the tray 120 are guided along the guide slots 102c formed at both side surfaces of the casing 102.

In the state where the tray 120 has been drawn forward out of the casing 102, slices of bread to be baked are inserted through the input ports 104 to be put on the tray 120, and then the toaster door 130 is closed again. When the toaster door 130 is closed, the cooperating levers 122 are restored to their original positions by the elastic restoring force of the springs S, so that the tray 120 is also returned into the casing 102.

In this state, when a button 115 for the toaster function, which is disposed on the control panel 114, is pressed, heating is initiated by the heaters 140 in the casing 102. During the heating operation by the heater, a predetermined gap is maintained between the heater and the slices of bread, and the entire surfaces of the slices of bread are uniformly heated. When the slices of bread has been completely baked after a predetermined time, the toaster door 130 can be opened, so that the baked slices of bread can be picked up from the drawn tray 120. Then, completed is a labor of making toast.

In a microwave oven according to the present invention as described above, it is noticed that a toaster section, which is opened and closed by a toaster door, is disposed at a portion in front of an instrument compartment.

According to the present invention as described above, there is provided a convenience of use, which enables a user to bake slices of bread even with a microwave oven. Therefore, the present invention provides an advantage of enlarging the utility of a microwave oven, since a microwave oven according to the present invention not only can perform a heating function by means of microwave but also can bake slices of bread most preferably by means of heaters.

Further, in a microwave oven according to the present invention, it is noticed that a toaster section for baking bread is disposed in front of an instrument compartment. Therefore, the instrument compartment having a relatively abundant space is utilized in arranging the toaster section, so that the toaster section can be installed without reducing an interior space of a heating chamber and without increasing the entire dimension of the microwave oven. Furthermore, there is provided an additional advantage in the construction thereof, in that the electric power required by the toaster section can be easily supplied from the instrument compartment.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A microwave oven having a toaster, the microwave oven comprising:
    a heating chamber, in which food is heated;
    an instrument compartment disposed at one side of the heating chamber, the instrument compartment containing electric components for generating microwaves supplied to the heating chamber;
    a toaster casing disposed in front of the instrument compartment, the toaster having input ports formed at a front surface of the toaster; and
    a toaster section disposed in the toaster casing, the toaster section having at least a heater for heating bread.

2. A microwave oven having a toaster as claimed in claim 1, the microwave oven further comprising a toaster door for opening and closing the toaster casing.

3. A microwave oven having a toaster as claimed in claim 2, wherein the toaster door is disposed in such a manner that the toaster door can be opened and closed while pivoting downward and upward about a hinge shaft disposed at a lower end of the toaster door.

4. A microwave oven having a toaster as claimed in claim 3, the microwave oven further comprising: a tray for seating bread thereon, the tray being disposed at an inner bottom portion of the toaster casing; and at least a cooperating lever for connecting the tray with a middle portion of a side of the toaster door, so that the tray is drawn forward by an opening operation of the toaster door.

5. A microwave oven having a toaster as claimed in claim 4, wherein the cooperating lever has a rear end connected to a spring, which is fixed to a rear wall of the toaster casing, so that the cooperating lever is elastically supported backward.

6. A microwave oven having a toaster as claimed in claim 4, wherein the tray comprises sliding protuberances protruding laterally outward from both sides of the tray, the sliding protuberances being inserted in guide slots formed at side surfaces of the toaster casing, so as to guide forward and backward movements of the tray.

7. A microwave oven having a toaster as claimed in claim 1, the microwave oven further comprising a flour collector disposed at a lowest portion of the casing, the flour collector having a shape of a drawer, which is horizontally inserted into and drawn out of the toaster casing.

8. A microwave oven having a toaster as claimed in claim 1, wherein the toaster casing has a front plate disposed at a front portion of the toaster casing, the front plate having a pair of input ports formed through the front plate.

9. A microwave oven having a toaster as claimed in claim 1, wherein the heater disposed in the toaster casing comprises a core plate, on which heat wires are wound, and outer plates, which are disposed as to surround both side surfaces of the core plate.

10. A microwave oven having a toaster as claimed in claim 9, wherein the heater further comprises a plurality of guides disposed at outer portions of the heater, the guides being arranged in such a manner as to maintain the heater in a location spaced with a predetermined distance from the bread.

11. A microwave oven having a toaster as claimed in claim 10, wherein the microwave oven comprises three heaters disposed in the toaster casing, the three heaters being spaced apart with intervals in a transverse direction of the toaster casing.

* * * * *